United States Patent
Muller et al.

(10) Patent No.: US 8,448,730 B2
(45) Date of Patent: May 28, 2013

(54) MULTI-AXLE HYBRID DRIVE SYSTEM FOR A VEHICLE

(75) Inventors: Axel Michael Muller, Friedrichshafen (DE); Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 145 days.

(21) Appl. No.: 13/123,741

(22) PCT Filed: Nov. 5, 2009

(86) PCT No.: PCT/EP2009/064689
§ 371 (c)(1),
(2), (4) Date: Apr. 12, 2011

(87) PCT Pub. No.: WO2010/057782
PCT Pub. Date: May 27, 2010

(65) Prior Publication Data
US 2011/0287888 A1 Nov. 24, 2011

(30) Foreign Application Priority Data
Nov. 19, 2008 (DE) .......................... 10 2008 043 849

(51) Int. Cl.
*B60K 6/445* (2007.10)
(52) U.S. Cl.
USPC ..................................... 180/65.235; 180/65.7
(58) Field of Classification Search
USPC ........ 180/65.28, 65.51, 65.285, 65.1, 65.225, 180/65.245, 65.27, 65.235
See application file for complete search history.

(56) References Cited

U.S. PATENT DOCUMENTS

| | | | |
|---|---|---|---|
| 4,469,187 A | 9/1984 | Hagin et al. | |
| 5,438,228 A * | 8/1995 | Couture et al. | 310/67 R |
| 6,661,109 B2 * | 12/2003 | Fukasaku et al. | 180/65.1 |
| 6,965,173 B2 * | 11/2005 | Fukasaku et al. | 180/65.225 |
| 7,163,480 B2 * | 1/2007 | Supina et al. | 475/5 |
| 7,244,208 B2 | 7/2007 | Bauknecht et al. | |
| 7,287,612 B2 | 10/2007 | Tarasinski et al. | |
| 7,398,846 B2 * | 7/2008 | Young et al. | 180/65.51 |
| 7,540,344 B2 * | 6/2009 | Yamamoto et al. | 180/65.285 |
| 7,877,184 B2 * | 1/2011 | Watanabe et al. | 180/65.28 |
| 2005/0052080 A1 * | 3/2005 | Maslov et al. | 307/10.1 |
| 2006/0030450 A1 * | 2/2006 | Kyle | 477/3 |
| 2007/0029127 A1 * | 2/2007 | Mori et al. | 180/247 |

(Continued)

FOREIGN PATENT DOCUMENTS

| | | |
|---|---|---|
| AT | 007 740 U1 | 7/2004 |
| DE | 26 49 806 A1 | 5/1978 |

(Continued)

*Primary Examiner* — Hau Phan
(74) *Attorney, Agent, or Firm* — Davis & Bujold, PLLC

(57) ABSTRACT

A multi-axle hybrid drive system for a vehicle which comprises a first unit (4) with an internal combustion engine (5), a separator clutch and a semi-automatic gearshift transmission (6) that is associated with a first, mechanically driven axle (7) of the vehicle. At least one further unit (10), with either wheel-hub motors (8) or with a conventional electric axle drive in combination with an electric machine, such that, in each case, a unit (10) is associated with a respective electrically driven axle (9) of the vehicle. During a gearshift, the vehicle (1) can be driven by the unit (10) associated with the electrically driven axle (9) such that the traction force interruption, occurring in the semi-automatic gearshift transmission (6) during a gearshift, is compensated.

6 Claims, 1 Drawing Sheet

U.S. PATENT DOCUMENTS

| | | |
|---|---|---|
| 2007/0188125 A1 * | 8/2007 | Shepard .................. 318/778 |
| 2007/0193795 A1 | 8/2007 | Forsyth |
| 2008/0051248 A1 | 2/2008 | Kozarekar et al. |
| 2010/0025131 A1 * | 2/2010 | Gloceri et al. ............ 180/65.28 |

FOREIGN PATENT DOCUMENTS

| | | |
|---|---|---|
| DE | 30 45 114 A1 | 6/1982 |
| DE | 32 46 182 A1 | 6/1984 |
| DE | 103 16 862 A1 | 10/2004 |
| DE | 103 46 640 A1 | 5/2005 |
| DE | 10 2006 021 156 A1 | 11/2007 |
| DE | 10 2008 041 985 A1 | 3/2010 |
| GB | 2 441 655 A | 3/2008 |
| JP | 09301002 A * | 11/1997 |
| WO | 2005/115786 A1 | 12/2005 |
| WO | 2010/028925 A1 | 3/2010 |

* cited by examiner

MULTI-AXLE HYBRID DRIVE SYSTEM FOR A VEHICLE

This application is a National Stage completion of PCT/EP2009/064689 filed Nov. 5, 2009, which claims priority from German patent application serial no. 10 2008 043 849.9 filed Nov. 19, 2008.

FIELD OF THE INVENTION

The present invention relates to a multi-axle hybrid drive system for a vehicle.

BACKGROUND OF THE INVENTION

From the prior art, hybrid vehicles that comprise a hybrid transmission containing a main transmission and a hybrid assembly are known, in which the hybrid assembly as a rule replaces a hydrodynamic torque converter. In addition to the internal combustion engine they comprise at least one electric motor coupled to the main transmission by a gear system, as a rule, in the form of a planetary gear system, or an electric machine which can be operated either as a motor or as a generator, depending on the operating situation.

In series hybrid vehicles, a generator is driven by the internal combustion engine, the generator supplying electrical energy to the electric motor that drives the wheels. In such a case as a rule no gear steps are needed, since the electric machines used have a sufficiently large rotational speed range and high enough starting torque to move the vehicle. However, in series hybrid vehicles the vehicle is never driven purely mechanically by the internal combustion engine since no provision is made for coupling the internal combustion engine to the drivetrain, with the result that the drive energy is transmitted via an electric path which is characterized by greater losses compared with mechanical transmission. On the other hand, when wheel-hub motors are used in articulated buses a multi-axle drive can be created, which ensures an advantageous distribution of the drive power between the front coach and the trailer.

Furthermore parallel hybrid vehicles are known, in which the torques of the internal combustion engine and at least one electric machine that can be connected to the internal combustion engine are added, preferably by means of a summation gear system such as a planetary gear system. In this case the at least one electric machine can be connected to the belt drive or to the crank shaft of the internal combustion engine. The torques produced by the internal combustion engine and/or the at least one electric machine are transmitted to the drive axle by a downstream transmission.

For example, DE 103 46640 A1 by the present applicant describes a drivetrain for a hybrid vehicle, in which an internal combustion engine is in driving connection with a separator clutch whose output side is connected to a transmission input shaft connected to an input element of an automatic transmission. In the known drivetrain the transmission input shaft can also be driven by an electric machine, and for this purpose the rotor of the electric machine is connected to the transmission input shaft.

Parallel hybrid vehicles usually have an electric machine arranged on the primary side. When the main transmission is a powershift transmission, recuperation can also take place during a gearshift, i.e. electrical energy can be recovered from mechanical energy. When a semi-automatic manual-shift transmission is used as the main transmission the transmission has to be shifted under no load to carry out a gearshift, and this results in the disadvantage that the recuperation with the electric machine has to be interrupted.

In articulated buses, powershift automatic transmissions are predominantly used, which besides greater comfort and higher drive-power also offer potential savings compared with semi-automatic shifts with traction force interruption, since during a powershift, rotation energy stored in the primary masses is transferred into the drivetrain as a dynamic fraction of the drive torque. Disadvantageously, powershift transmissions have lower efficiency than a semi-automatic manual-shift transmission and are more expensive in terms of both production and maintenance.

SUMMARY OF THE INVENTION

The purpose of the present invention is to indicate a multi-axle hybrid drive system for a vehicle, in particular for an articulated bus, which has an inexpensive semi-automatic manual-shift transmission and which enables recuperation during gearshifts.

In addition, during a gearshift the traction force interruption that occurs with semi-automatic manual-shift transmissions should be perceived by the driver as little as possible. Furthermore, purely mechanical operation and combined operation with both the internal combustion engine and the electric machine should be possible.

A hybrid drive system is proposed, which comprises a first unit with an internal combustion engine, a separator clutch and a semi-automatic gearshift transmission, which is associated with a first, mechanically driven axle of the vehicle. In addition, the drive system according to the invention comprises a further, second unit with wheel-hub motors or with a conventional electric axle drive in combination with an electric machine, which is associated with a second, electrically driven axle of the vehicle. According to the invention, during a gearshift the vehicle is powered by the unit associated with the electrically driven axle in such manner that the traction force interruption in the semi-automatic gearshift transmission during the gearshift is compensated.

According to the invention, further units comprising wheel-hub motors or a conventional electric axle drive in combination with an electric machine can be provided, in each case associated with a further electrically driven axle of the vehicle.

The first unit can comprise an electric machine arranged on the primary side, whose energy accumulator can be connected to the second unit; according to a further development of the invention this eliminated the need for an electric machine in the second unit when the second unit comprises a conventional electric axle drive, since the supply of current to the second unit and the recuperation can be taken over by the electric machine of the first unit arranged on the primary side.

In the case when the second unit has wheel-hub motors, there is no need for an energy accumulator in the second unit since the wheel-hub motors can be connected to the energy accumulator of the electric machine arranged on the primary side.

By virtue of the design of the drive system according to the invention, purely mechanical, purely electric, or combined operation are made possible, the latter by simultaneously driving the mechanically and the at least one electrically driven axles.

In the case of an articulated bus it can be provided that the mechanically driven axle is an axle of the rear coach, whereas the at least one electrically driven axle is an axle of the front coach.

Furthermore, during a gearshift in the semi-automatic gearshift transmission recuperation can take place in the first or the second unit by means of the electric machine.

BRIEF DESCRIPTION OF THE DRAWINGS

Below, an example of the invention will be explained in more detail with reference to the attached figures, which show.

DETAILED DESCRIPTION OF THE PREFERRED EMBODIMENTS

Figure 1:
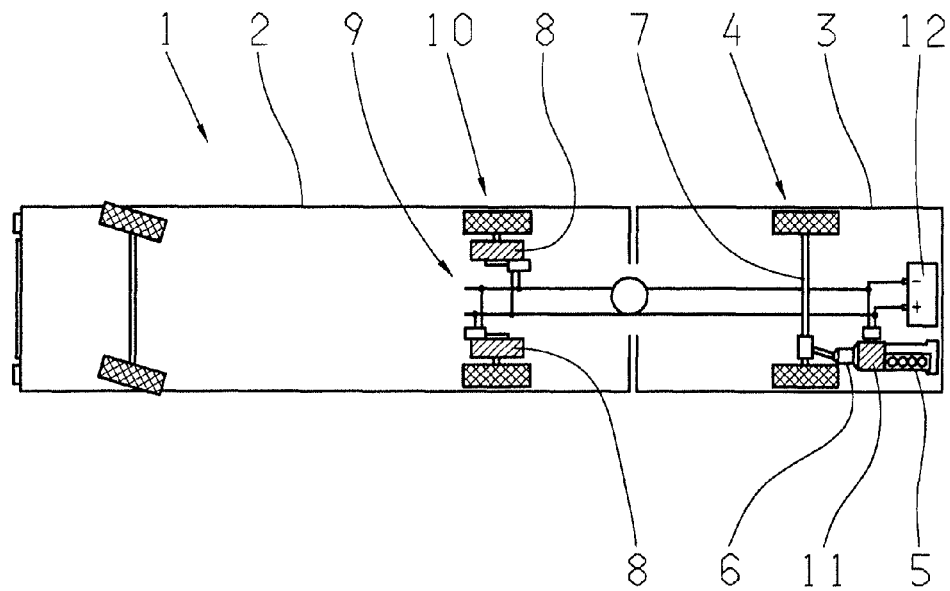
FIG. 1: Schematic representation of an articulated bus with a hybrid drive system designed according to a first embodiment of the invention.
Figure 2:
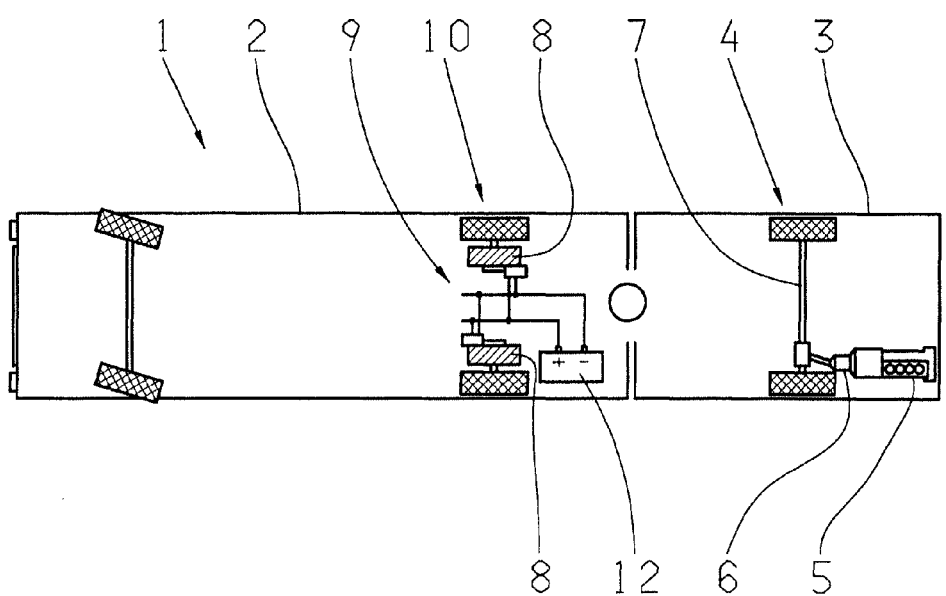
FIG. 2: Schematic representation of an articulated bus with a hybrid drive system designed according to a second embodiment of the invention

FIGS. 1 and 2 show an articulated bus 1 with a front coach 2 and a rear coach 3. In the embodiment shown in FIG. 1 the drive unit according to the invention comprises a first unit 4 with an internal combustion engine 5, a separator clutch and a semi-automatic gearshift transmission 6, which is associated with the mechanically driven axle 7 of the rear coach 3 of the articulated bus 1. In the embodiment shown the first unit 4 comprises an electric machine 11 on the primary side, whose energy accumulator is indexed 12, so that this unit serves as a parallel hybrid.

A second unit 10 of the drive system comprising wheel-hub motors 8 is associated with an electrically driven axle 9 of the front coach 2, the wheel-hub motors 8 being connected to the energy accumulator 12 of the first unit 4. The design of the second unit corresponds to a series hybrid drive.

Thanks to this design of the drive system, during a gearshift the articulated bus 1 can be driven by the unit 10 associated with the electrically driven axle 9, whereby the traction force interruption occurring in the semi-automatic gearshift transmission during the gearshift can be compensated. Moreover, recuperation is possible during a gearshift, i.e. when the transmission 6 is shifted while free from load, the recuperation being effected by the second unit 10.

The embodiment of the invention shown in FIG. 2 differs from that shown in FIG. 1, in that the first unit 4 has no electric machine, whereas the second unit 10 comprises an energy accumulator 12 which supplies energy to the wheel-hub motors and stores the recuperation energy.

In other designs of the invention, instead of a semi-automatic gearshift transmission a powershift automatic transmission can be provided.

Of course, any design formation and, in particular, any spatial arrangement of the components of the drive system according to the invention, in their own right and relative to one another and provided that they are technically appropriate, fall within the protective scope of the present claims without influencing the function of the drive system as indicated in the claims, even if such formations are not explicitly shown in the figures or mentioned in the description.

Indexes

1 Articulated bus
2 Front coach
3 Rear coach
4 First unit
5 Internal combustion engine
6 Transmission
7 Axle
8 Wheel-hub motor
9 Axle
10 Second unit
11 Electric machine
12 Energy accumulator

The invention claimed is:

1. A multi-axle hybrid drive system for a an articulated bus (1), the multi-axle hybrid drive system comprising:
a first unit (4) having an internal combustion engine (5), a separator clutch and a semi-automatic gearshift transmission (6) all associated with a first, mechanically driven axle (7) of the articulated bus (1) for supplying drive thereto; and
at least one further unit (10) with one of wheel-hub motors (8) and a conventional electric axle drive in combination with an electric machine such that the at least one further unit (10) being associated with a respective electrically driven axle (9) of the articulated bus (1);
wherein during a gearshift, the articulated bus (1) is drivable by the at least one further unit (10), associated with the electrically driven axle (9), such that any traction force interruption, occurring in the semi-automatic gearshift transmission (6) during the gearshift, is compensated;
during a gearshift, recuperation is effected by the at least one further unit (10) associated with the electrically driven axle (9);
an energy accumulator (12) is provided for accumulating enemy; and
the mechanically driven axle (7) is an axle of a rear coach (3) of the articulated bus (1) and the at least one electrically driven axle (9) is an axle of a front coach (2) of the articulated bus (1).

2. The multi-axle hybrid drive system for the articulated bus (1) according to claim 1, wherein the first unit (4) is a parallel hybrid and comprises an electric machine (11) arranged on a primary side.

3. The multi-axle hybrid drive system for the articulated bus (1) according to claim 1, wherein the energy accumulator (12) is included as part of the first unit (4).

4. The multi-axle hybrid drive system for the articulated bus (1) according to claim 2, wherein the at least one further unit (10) comprises a conventional electric axle drive in combination with an electric machine, and current is supplied to the at least one further unit (10) and the recuperation is effected by the electric machine (11) of the first unit (4) arranged on the primary side.

5. A multi-axle hybrid drive system for an articulated bus (1) comprising a front coach (2) and a rear coach (3), the drive system comprising:
a first unit (4) comprising an internal combustion engine (5), a separator clutch and a semi-automatic gearshift transmission (6) for mechanically driving a first axle (7) of the vehicle;
a second unit (10) comprising a second axle (9) being coupled to and electrically driven by one wheel-hub motors (8) and a combination of a conventional electric axle drive (9) and an electric machine;
an energy accumulator (12) being connected to both the first unit (4) and the second unit (10), and the first unit (4) charging the energy accumulator (12) when the semi-automatic gearshift transmission (6) is engaged and the internal combustion engine (5) is operating;

the rear coach (3) being pivotally coupled to the front coach (2), and the second unit (10) being supported by the front coach (2) and the first unit (4) being supported by the rear coach (3);

the second unit (10) driving the vehicle (1) with the electrically driven axle (9) when traction force, from the semi-automatic gearshift transmission (6) to the first axle (7), is interrupted during a gearshift of the semi-automatic gearshift transmission (6); and the second unit (10) charging the energy accumulator (12) when traction force from the semi-automatic gearshift transmission (6) to the first axle (7) being interrupted during a gearshift of the semi-automatic gearshift transmission (6).

6. The multi-axle hybrid drive system for the articulated bus (1) according to claim 1, wherein the energy accumulator (12) is included as part of the at least one further unit (10).

\* \* \* \* \*